(12) United States Patent
Ramlall

(10) Patent No.: US 10,763,906 B1
(45) Date of Patent: Sep. 1, 2020

(54) COGNITIVE RADIO TECHNIQUE FOR EFFICIENTLY RECEIVING MULTIPLE SIGNALS USING POLYPHASE DOWNCONVERTER CHANNELIZERS

(71) Applicant: Naval Information Warfare Center, Pacific, San Diego, CA (US)

(72) Inventor: Sunil V. Ramlall, San Diego, CA (US)

(73) Assignee: United States of America as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 16/749,733

(22) Filed: Jan. 22, 2020

(51) Int. Cl.
H04B 1/16 (2006.01)

(52) U.S. Cl.
CPC ........................ *H04B 1/16* (2013.01)

(58) Field of Classification Search
CPC .......... H04B 1/0007; H04B 1/16; H04B 1/18; H04B 1/04; H04B 2001/045; H03M 1/1255; H03H 17/0226; H04L 5/001; H04L 5/0044; H04L 25/03878; H04L 27/00
See application file for complete search history.

(56) References Cited

U.S. PATENT DOCUMENTS

| | | | |
|---|---|---|---|
| 8,582,675 B1* | 11/2013 | Harris | H04L 27/0006 375/260 |
| 9,438,277 B2 | 9/2016 | Ramlall et al. | |
| 10,715,196 B1* | 7/2020 | Yeste Ojeda | H04B 1/04 |
| 2003/0069009 A1* | 4/2003 | Harnden | H04B 1/28 455/423 |
| 2015/0365185 A1 | 12/2015 | Thompson et al. | |
| 2017/0012598 A1 | 1/2017 | Harris et al. | |
| 2018/0102926 A1 | 4/2018 | Marr et al. | |
| 2019/0089054 A1* | 3/2019 | Civerolo | H01Q 3/40 |

OTHER PUBLICATIONS

S. Ramlall, "On the IF spectral placement of bandpass sampled signals," IEEE DSP Workshop, pp. 164-168, Aug. 11-14, 2013.
Lin et al., "Finding the minimum sampling frequency of multi-band signals: an efficient iterative algorithm," in Proc. of IEEE Int. Symp, pp. 57-60, May 30-Jun. 2, 2010.
Lin et al., "A new iterative algorithm for finding the minimum sampling frequency of multibend signals," IEEE Trans. Signal, vol. 58, No. 10, pp. 5446-5450, Oct. 2010.
Harris et al., "Polyphase analysis filter bank down-converts unequal channel bandwidths with . . . ," Analog Integrated Circuits, vol. 71, No. 3, pp. 481-494, Jun. 2012.

* cited by examiner

*Primary Examiner* — Thanh C Le
(74) *Attorney, Agent, or Firm* — Naval Information Warfare Center, Pacific; Kyle Eppele

(57) ABSTRACT

A system and method are disclosed for selecting a sampling frequency in a system that performs bandpass sampling and uses a polyphase downconverter channelizer to receive multiple RF signals. The method accounts for the frequency location of the received signals throughout the signal reception process to simplify the overall processing. The procedure finds a sampling frequency that positions all or a subset of the sampled signals such that the sampled signals fall within the input channels of the polyphase downconverter channelizer, thus simplifying processing compared to prior art methods which address the bandpass sampling and polyphase downconverter channelizer components separately.

20 Claims, 6 Drawing Sheets

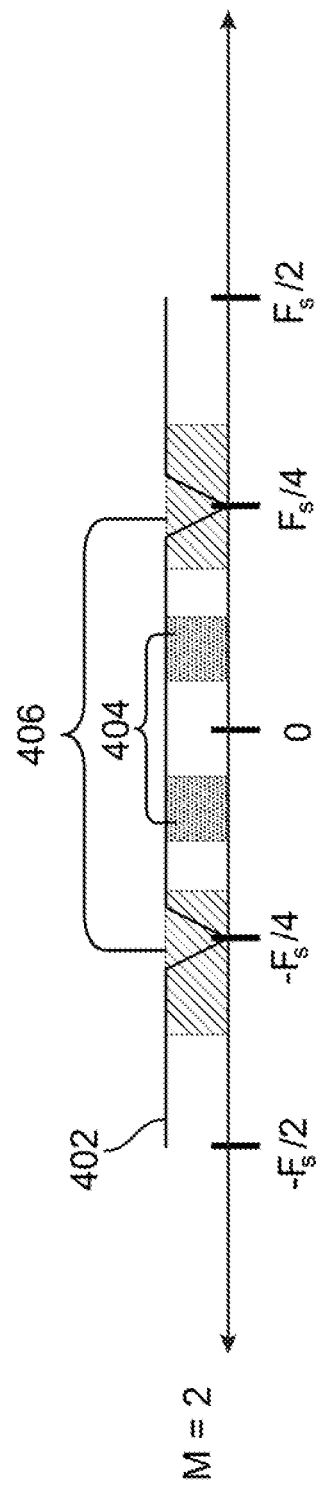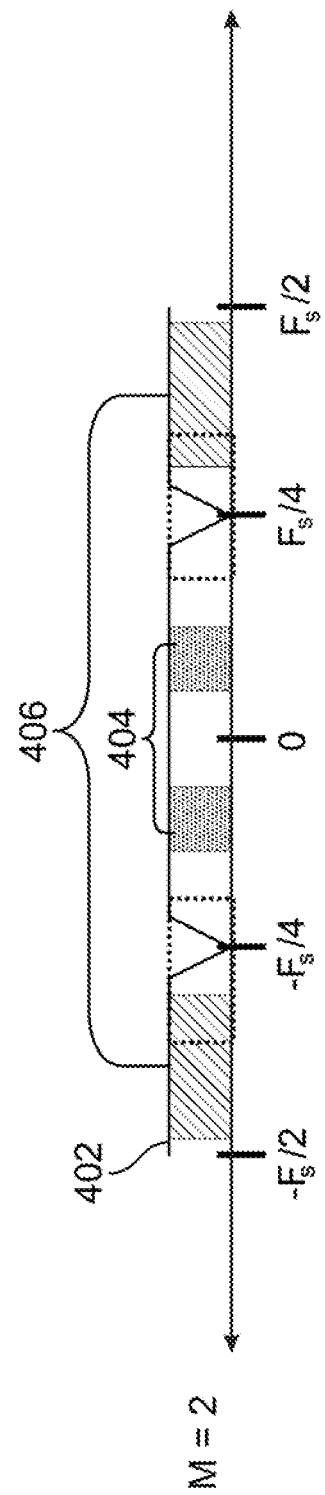

COGNITIVE RADIO TECHNIQUE FOR EFFICIENTLY RECEIVING MULTIPLE SIGNALS USING POLYPHASE DOWNCONVERTER CHANNELIZERS

FEDERALLY-SPONSORED RESEARCH AND DEVELOPMENT

The United States Government has ownership rights in this invention. Licensing inquiries may be directed to Office of Research and Technical Applications, Naval Information Warfare Center, Pacific, Code 72120, San Diego, Calif., 92152; telephone (619) 553-5118; email: ssc_pac_t2@navy.mil. Reference Navy Case No. 104985.

BACKGROUND OF THE INVENTION

Multiple radio frequency (RF) signal reception is becoming and will certainly be a key capability in current and future radio communications. It has already begun to be used in Long-Term Evolution (LTE)-Advanced and is a key feature of 5G New Radio (NR) (the next major cellular standard after LTE) because of the high data rates it enables; specifically, carrier aggregation allows for the use of up to five carriers in LTE-Advanced and up to sixteen carriers in 5G NR to increase data rates. With the overcrowded nature of frequency spectrum due to limited spectrum resources, cognitive radios will need to be able to dynamically receive multiple signals at carrier frequencies that change with time. While the prior art does not address this issue, it may be desirable to consider methods of reducing computational complexity in RF receivers from a holistic perspective for multiple signal reception applications. Typically others try to minimize the complexity at each stage of the signal reception process which does not necessarily result in the lowest complexity when looked at from a larger perspective. For example, using the smallest valid sampling rate to sample multiple signals without considering where the signals are placed after sampling. Another example is taking the signal placement at the input to a polyphase downconverter channelizer as a given and introducing additional computational complexity in the channelizer or at its output to process signals not falling entirely within one of the input channels.

Bandpass sampling of a single analog RF signal is well known. This will be described with reference to FIG. 1.

FIG. 1 illustrates a prior art bandpass-filtering system 100, which includes an antenna 102 and a receiving portion 104. Receiving portion 104 includes a bandpass filter, and LNA component 106 and an ADC component 108.

In operation, antenna 102 receives an analog radio frequency (RF) signal 118, having a carrier frequency. Antenna 102 passes analog RF signal 118 to receiving portion 104 via line 112. Bandpass filters and LNA component 106 bandpass-filters and amplifies analog RF signal 118 so as to output amplified filtered analog RF signal 120 to ADC component 108 via line 114. ADC component 108 samples amplified filtered analog RF signal 120 at a predetermined sample rate that is below its Nyquist rate and that is still able to reconstruct the signal. ADC component 108 outputs an intermediate frequency (IF) digital signal 122 that corresponds to amplified filtered analog RF signal 120 via an output line 116 for further processing (not shown).

Further using a polyphase downconverter channelizer to separate a plurality of received signals is well known. What is needed is a system and method that determines a minimum sampling frequency, $F_s$, for use in the bandpass sampling of a plurality of received signals.

SUMMARY OF THE INVENTION

An aspect of the present disclosure is drawn to a system for receiving a plurality N of analog radio frequency signals. The system includes a bandpass-filtering component, an analog to digital converter (ADC), an M-path polyphase downcoverter channelizer, a range-finding component and a frequency-setting component. The bandpass-filtering component is operable to bandpass filter the plurality N of analog radio frequency signals. The ADC is operable to generate digitally sampled signals based on the bandpass-filtered plurality N of analog radio frequency signals. The N-path polyphase downcoverter channelizer is operable to output converted intermediate frequency N signals based on the digitally sampled signals, respectively. The range-finding component is operable to determine a minimum sample frequency range, $[F_{s,min1}, F_{s,min2}]$, for sampling the bandpass-filtered plurality of analog radio frequency signals. The frequency-setting component is operable to determine the minimum sampling frequency, $F_s$, and to provide a sampling frequency instruction to the ADC. $F_{s,min1}$ is the smallest sampling frequency that results in no aliasing of the N signals when bandpass sampling is performed, whereas $F_{s,min2}$ is larger than $F_{s,min1}$ and additionally results in no aliasing of the N signals when bandpass sampling is performed, wherein $F_{s,min1} \leq F_s \leq F_{s,min2}$. The ADC is operable to sample the bandpass-filtered plurality N of analog radio frequency signals using the minimum sampling frequency, $F_s$, indicated in the sampling frequency instruction to generate digitally sampled signals, wherein N is an integer greater than one.

BRIEF DESCRIPTION OF THE DRAWINGS

The accompanying drawings, which are incorporated in and form a part of the specification, illustrate example embodiments and, together with the description, serve to explain the principles of the disclosure. A brief summary of the drawings follows.

FIG. 4A illustrates the example of M=2 and the associated channel inputs.

FIG. 4B illustrates the example of M=2 and the associated channel inputs in accordance with aspects of the present disclosure.

DETAILED DESCRIPTION OF THE EMBODIMENTS

Figure 1:
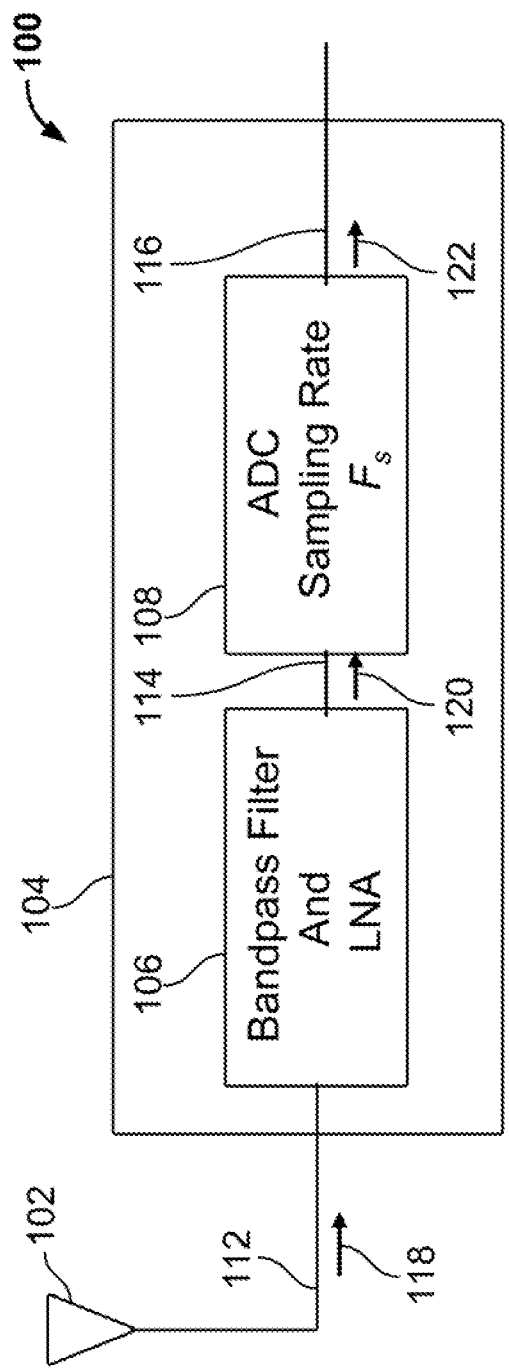
FIG. 1 illustrates a prior art bandpass-filtering system.

An aspect of the present disclosure is drawn to a computationally efficient procedure for selecting a sampling frequency in a system that performs bandpass sampling and that uses a polyphase downconverter channelizer to receive multiple RF signals. The procedure finds a sampling frequency that positions all or a subset of the sampled signals such that the sampled signals fall entirely within the input channels of the polyphase downconverter channelizer.

In the case of multiple RF signal reception, there are N real, continuous-time bandpass signals denoted as $x_1(t)$, $x_2(t), \ldots, x_N(t)$. Each $x_i(t)$ i=1, ..., N has an arbitrary carrier frequency $f_{Ci}$ and bandwidth $B_i$ (i.e., $X_i(f)$ is only nonzero on the intervals $(-f_{Ci}-B_i/2, -f_{Ci}+B_i/2)$ and $(f_{Ci}-B_i/2, f_{Ci}+B_i/2)$). A system in accordance with aspects of the present disclosure uses bandpass sampling and a polyphase downconverter channelizer to receive the signals. The signals are received with an antenna, which is then followed by bandpass filters and amplifiers before being sampled by an analog-to-digital converter (ADC). The sampled signals are then processed using a polyphase downconverter channelizer to bring the signals to baseband. As in traditional bandpass-sampling literature, the RF hardware (i.e. antenna, bandpass filters, amplifiers, and ADC) are such that they enable bandpass sampling to be used. As a result, the bandpass filters attenuate all signals outside of the N frequency bands. Moreover, as a result, the low noise amplifier(s) amplify the signals such that they can be sampled by the ADC. Further, as a result, analog bandwidth of the ADC is sufficient to sample the signals at the carrier frequencies of the N signals.

At a high level, a method of receiving signals in accordance with aspects of the present disclosure includes four steps. In the first step, the minimum sampling frequency range is found. In the second step, within the sampling frequency range from the first step, it is determined whether each of the N sampled signals can fall entirely within an input channel of the polyphase downconverter channelizer. In the third step, if a signal can fall within an input channel, it is determined whether the signal can be placed at the center of the input channel. Finally, in the fourth step, based on the second and third steps, a sampling frequency is selected. These steps are described in more detail below.

Aspects of the present disclosure are drawn to bandpass sampling and using a polyphase downconverter channelizer to receive multiple RF signals. In particular, an aspect of the present disclosure is drawn to determining a minimum sampling frequency, $F_s$, for use in the bandpass sampling. The procedure finds a sampling frequency that positions all or a subset of the sampled signals such that the sampled signals fall entirely within the input channels of the polyphase downconverter channelizer. Aspects of a bandpass sampling system and method in accordance with the present disclosure will now be described with additional reference to FIGS. 2-7.

Figure 2:
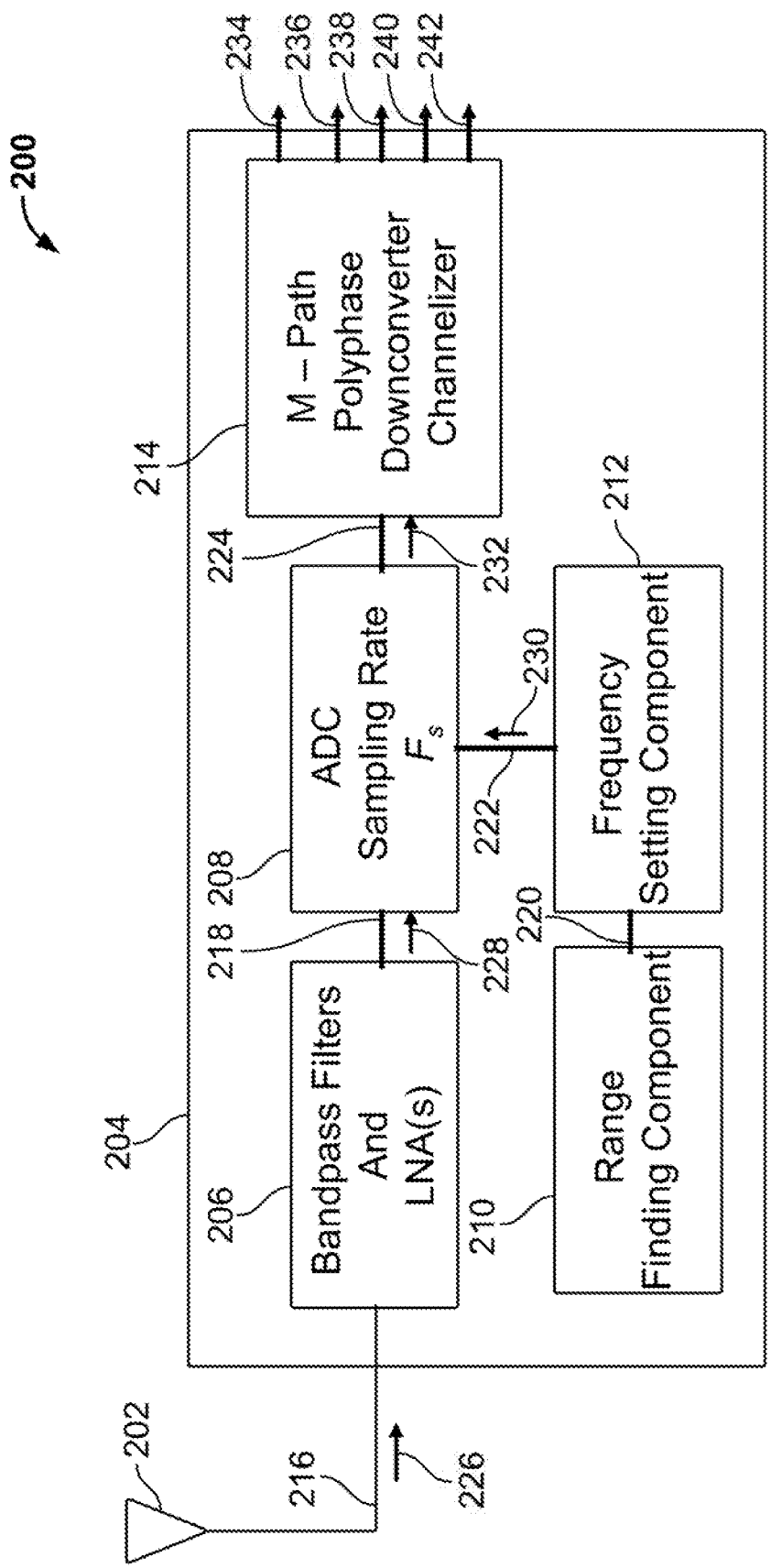
FIG. 2 illustrates a receiver in accordance with aspects of the present disclosure.

FIG. 2 illustrates a receiver 200 in accordance with aspects of the present disclosure. As shown in the figure, receiver 200 includes an antenna 202 and a receiving portion 204. Receiving portion 204 includes a combined bandpass filters/LNA component 206, an ADC component 208, a range-finding component 210, a frequency-setting component 212 and an M-path polyphase downconverter channelizer 214.

In this example, combined bandpass filters/LNA component 206, ADC component 208, range-finding component 210 frequency-setting component 212 and M-path polyphase downconverter channelizer 214 are illustrated as individual devices. However, in some embodiments, at least two of combined bandpass filters/LNA component 206, ADC component 208, range-finding component 210, frequency-setting component 212, and M-path polyphase downconverter channelizer 214 may be combined as a unitary device. Further, in some embodiments, at least one of combined bandpass filters/LNA component 206, ADC component 208, range-finding component 210, frequency-setting component 212, and M-path polyphase downconverter channelizer 214 may be implemented as a computer having tangible computer-readable media for carrying or having computer-executable instructions or data structures stored thereon. Such tangible computer-readable media can be any available media that can be accessed by a general purpose or special purpose computer. Non-limiting examples of tangible computer-readable media include physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. For information transferred or provided over a network or another communications connection (either hardwired, wireless, or a combination of hardwired or wireless) to a computer, the computer may properly view the connection as a computer-readable medium. Thus, any such connection may be properly termed a computer-readable medium. Combinations of the above should also be included within the scope of computer-readable media.

In operation, antenna 202 receives a plurality, n, of analog radio frequency (RF) signals 226, each with a different respective carrier frequency, wherein n is an integer greater than 1. Antenna 202 passes analog RF signals 226 to receiving portion 204 via line 216. Combined bandpass filters/LNA component 206 bandpass-filters and amplifies analog RF signals 226 so as to output N amplified filtered analog RF signals 228 to ADC component 208 via line 218, wherein N is equal to n.

Range-finding component 210 determines a minimum sample frequency range, $[F_{s,min1}, F_{s,min2}]$, for which ADC component 208 should sample the bandpass-filtered plurality of analog radio frequency signals. $F_{s,min1}$ is the smallest sampling frequency that results in no aliasing of the N amplified filtered analog RF signals 228 when bandpass sampling is performed. $F_{s,min2}$ is larger than $F_{s,min1}$ and additionally results in no aliasing of the N amplified filtered analog RF signals 228 when bandpass sampling is performed.

Frequency-setting component 212 determines the minimum sampling frequency, $F_s$, for which ADC component 208 should sample the bandpass-filtered plurality of analog radio frequency signals, wherein $F_{s,min1} \leq F_s \leq F_{s,min2}$. Frequency-setting component 212 provides a sampling frequency instruction 230 to ADC component 208 via line 222. Sampling frequency instruction 230 instructs ADC component 208 to sample the bandpass-filtered plurality of analog radio frequency signals using $F_s$.

ADC component 208 down-samples the amplified filtered analog RF signals 228 and converts them to IF digital signals 232 using $F_s$ as indicated by sampling frequency instruction 230, which is provided by frequency-setting component 212. IF digital signals 232, being a single digital bit stream, correspond to the amplified filtered analog RF signals 228 as separated in the frequency domain. M-path polyphase downconverter channelizer 214 separates the IF digital signals 232 into M different respective channels, separated in the time domain, for distribution as M output signals, wherein M is an integer greater than or equal to two (2). In this example embodiment, M is equal to five (5), such that the output signals are output signals 234, 236, 238, 240 and 242.

It should be noted that a system and method in accordance with aspects of the present disclosure do not require M to equal N. On the contrary, M is determined elsewhere. Because M-path polyphase downconverter channelizer 214 operates on digital samples, for example with software, the size M may easily be configured/changed for example by way of a radio.

The technique of bandpass sampling is known and includes the function of a bandpass filter and ADC. However, a novel feature of the present disclosure is the determination of $F_s$ by frequency-setting component 212 that enables efficient sampling by ADC component 208.

The standard M-path polyphase downconverter channelizer as known in the prior art can be commonly used to efficiently downconvert multiple signals when their carrier frequencies are equally spaced apart and they have equal bandwidths. If the carrier frequencies of the signals can be equal to integer multiples of $F_S/M$ (i.e. the output sampling rate of the M channels of the polyphase channelizer), then all of the signals will be shifted to baseband by the channelizer. If the signals have arbitrary carrier frequencies and bandwidths, a receiver design can be used, which consists of a modified version of the standard M-path polyphase downconverter channelizer followed by additional processing. When bandpass sampling is performed in a receiver followed by a polyphase downconverter, the carrier frequencies of the input to the downconverter can be the IFs of the sampled signals.

In a scenario where one or more of the IF signals falls within two input channels of M-path polyphase downconverter channelizer 214, additional processing after M-path polyphase downconverter channelizer 214 may be required to shift the signals to baseband. However (depending on the particular carrier frequencies and bandwidths of the signals before being sampled by ADC component 208), a sampling frequency $F_S$ may be selected in accordance with aspects of the present disclosure.

Figure 3:
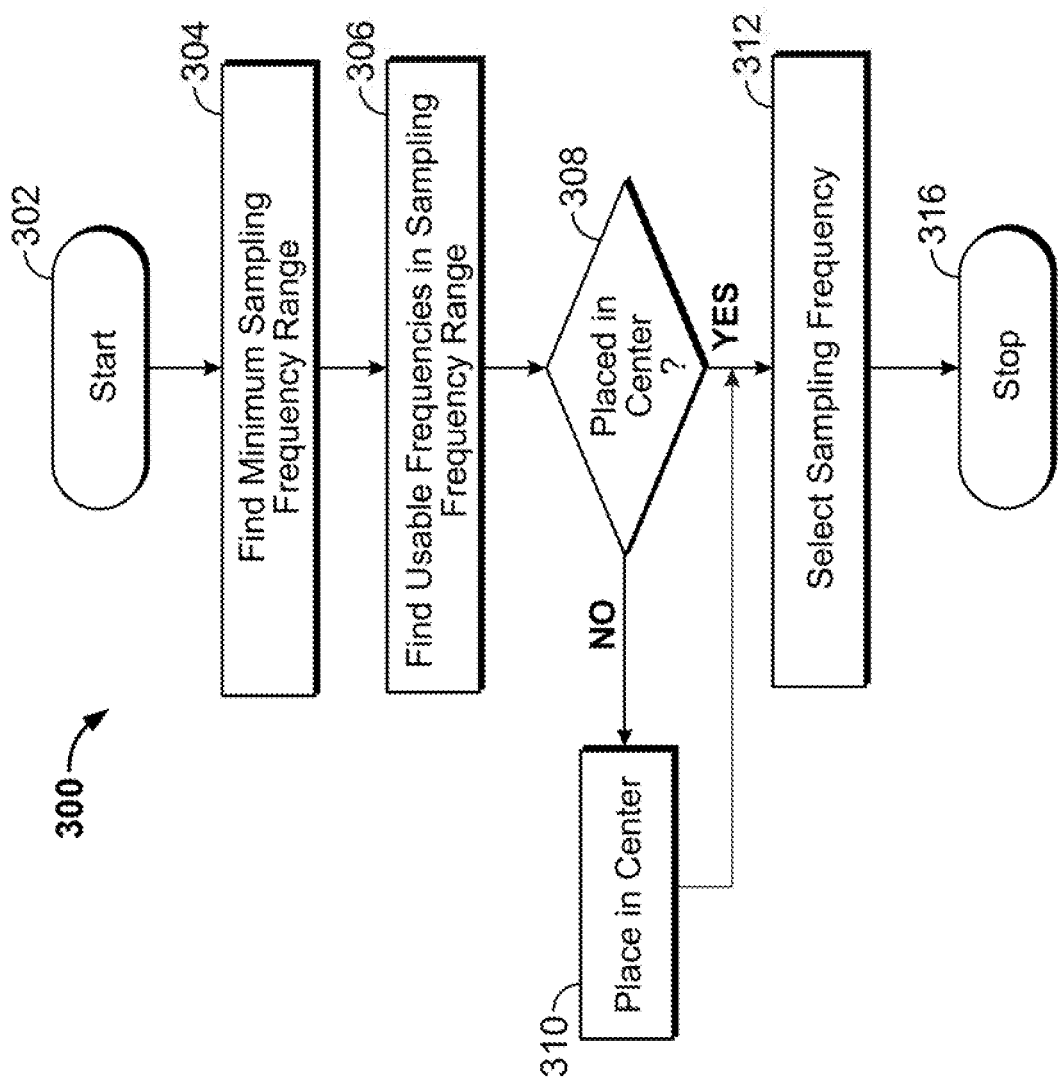
FIG. 3 illustrates a method of determining $F_s$ in accordance with aspects of the present disclosure.

A method 300 of determining $F_S$ in accordance with aspects of the present disclosure will now be described in greater detail with reference to FIG. 3. As shown in the figure, method 300 starts (S302) and a minimum sampling frequency range is determined (S304). For example, range-finding component 210 may find the minimum sampling frequency range based on the respective carrier frequencies of the received analog RF signals 226.

Example algorithms to find the minimum sampling frequency that results in no aliasing of the N signals when bandpass sampling is performed are well known. Non-limiting examples of such algorithms include Lin et al, "Finding the minimum sampling frequency of multi-band signals: an efficient iterative algorithm," in *Proc. of IEEE Int. Symposium on Circuits and Systems*, pp. 57-60, 30 May-2 Jun. 2010 and Lin et al, "A new iterative algorithm for finding the minimum sampling frequency of multiband signals," *IEEE Trans. Signal Processing*, vol. 58, no. 10, pp. 5446-5450, October 2010, the entire disclosures of which are incorporated herein by reference. Methods of how to find the smallest valid range of sampling frequencies as well as all valid ranges are additionally well known. Any of these known algorithms may be used to find the minimum sampling frequency that results in no aliasing of the N signals when bandpass sampling. The determined minimum sampling frequency range is denoted as $[F_{s,min1}, F_{s,min2}]$. Range-finding component 210 then provides the minimum sampling frequency range to frequency-setting component 212 via line 220.

After the minimum sampling frequency range is determined (S304), all possible sampling frequencies are found within the sampling frequency range that will place at least one signal within an input channel of M-path polyphase downconverter channelizer 214 (S306).

In an example embodiment, frequency-setting component 212 determines whether the amplified filtered analog RF signals 228 are within the input channels of M-path polyphase downconverter channelizer 214 by using the linear equation (1), which was derived in S. Ramlall, "On the IF spectral placement of bandpass sampled signals," IEEE DSP Workshop, pp. 164-168, 11-14 Aug. 2013, the entire disclosure of which in incorporated herein by reference. The equation is:

$$f_{IF} = (-1)^{n+1}\left(-\left\lfloor\frac{n}{2}\right\rfloor F_S + f_C\right) \quad (1)$$

where $f_{IF}$ is the intermediate frequency (i.e. frequency the signal is at after sampling), n is an integer, and $\lfloor \ \rfloor$ denotes the mathematical floor operation. Each of the N signals will have a value of n associated with it based on the sampling frequencies obtained in the sampling frequency range found in S304. Specifically, $$n_i = \left\lceil \frac{2\left(f_{Ci} + \frac{B_i}{2}\right)}{F_{S,min1}} \right\rceil \quad i = 1, \ldots, N \quad (2)$$

where $\lceil \ \rceil$ denotes the mathematical ceiling operation.

By using equation (2) to calculate $n_i$, the frequency location where each of the N signals are placed after sampling can be determined using (1). M-path polyphase downconverter channelizer 214 has M input channels as shown in FIGS. 4A-5C.

FIG. 4A illustrates the example of M=2, wherein a function 402 represents the channel inputs. In this example, there are two (2) valid input channels. However, it is not possible to place a bandpass sampled signal at the very center of the two channels. This example shows two signals, signal 404 and signal 406. Ideally, it is desirable to place the signals at the center of the channels, but it is more important that each signals falls somewhere entirely inside of a single channel. As shown in the figure, signal 404 falls entirely inside of a single channel, whereas signal 406 extends into two different channels. If a signal falls entirely inside of a single channel, then a system in accordance with aspects of the present disclosure determines whether the signal can be placed at the center of the channel.

Further, if a signal does not fall within a single channel, then additional processing after M-path polyphase downconverter channelizer 214 may be performed to place the signal entirely within a single channel. This will be shown in FIG. 4B. As shown in FIG. 4B, signal 406 has been moved so as to fall entirely within a single channel.

Figure 5A:
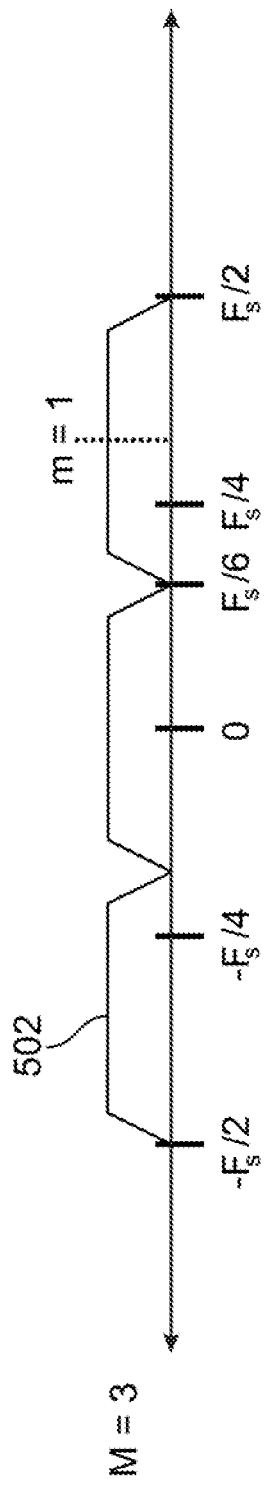
FIG. 5A illustrates the example of M=3 and the associated channel inputs.
Figure 5B:
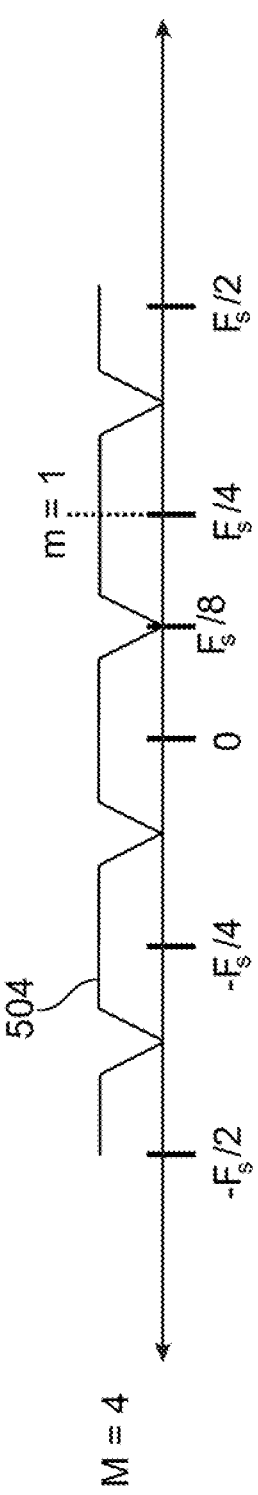
FIG. 5B illustrates the example of M=4 and the associated channel inputs.
Figure 5C:
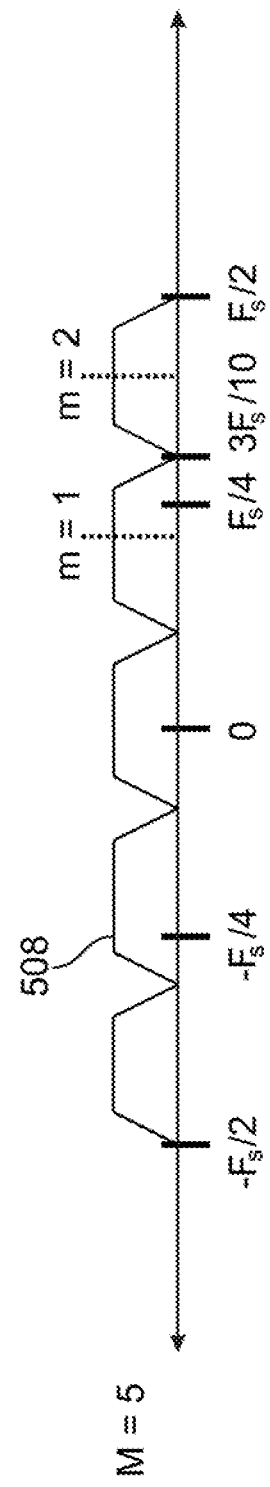
FIG. 5C illustrates the example of M=5 and the associated channel inputs.

It should be noted that only two signals are illustrated in FIGS. 4A-B. However, more signals may have been included. In particular, in accordance with aspects of the present disclosure, the number of signals do not have be less than or equal to the number of valid channels. Examples of additional channels will now be described FIG. 5A illustrates the example of M=3, wherein a function 502 represents the channel inputs. In this example, there are two valid input channels for use, the center of the second valid channel is indicated by m=1, which is disposed between $F_s/4$ and $F_s/2$. FIG. 5B illustrates the example of M=4, wherein a function 504 represents the channel inputs. In this example, there are three valid input channels for use, the center of the second valid channel is indicated by m=1, which is disposed at $F_s/4$. FIG. 5C illustrates the example of M=5, wherein a function 508 represents the channel inputs. In this example, there are three valid input channels for use, the center of the second valid channel is indicated by m=1, which is disposed at less than $F_s/4$, whereas the center of the third valid channel is indicated by m=2, which is disposed at $3F_s/10$.

For a given M, the input channel intervals given by $$\left[0, \frac{F_S/2}{M}\right], \left[\frac{F_S/2}{M}, \frac{3F_S/2}{M}\right], \left[\frac{3F_S/2}{M}, \frac{5F_S/2}{M}\right],$$

etc., up to the interval ending with $F_s/2$ are relevant. Note that only the input channels that contain positive frequencies are considered since the sampled signals are real and thus their Fourier transforms are conjugate symmetric. It is desirable to place signals such that they fall within the center of the input channels intervals mentioned above; otherwise, additional processing may be required to reassemble signal components that are split among multiple channels.

To determine if a signal falls entirely within an input channel, a linear set of equations needs to be solved. These can be solved efficiently using linear programming techniques. Denote the input channel interval as [LFs, UFs]. It is determined whether $f_{IFi}+B_i/2<UFs$ and $LFs<f_{IFi}-B_i/2$ for the signal to fall within the input channel. This results in the following linear set of equations depending on if $n_i$ is odd or even:

$$n_i \text{ odd: max } F_S \quad (3a)$$
$$\text{s.t. } \left(\left\lfloor \frac{n_i}{2} \right\rfloor + U\right)F_S > f_{Ci} + \frac{B_i}{2}$$
$$\left(\left\lfloor \frac{n_i}{2} \right\rfloor + L\right)F_S < f_{Ci} - \frac{B_i}{2}$$
$$F_{S,min1} \le F_S \le F_{S,min2}$$

$$\text{max} - F_S \quad (3b)$$
$$\text{s.t. } \left(\left\lfloor \frac{n_i}{2} \right\rfloor + U\right)F_S > f_{Ci} + \frac{B_i}{2}$$
$$\left(\left\lfloor \frac{n_i}{2} \right\rfloor + L\right)F_S < f_{Ci} - \frac{B_i}{2}$$
$$F_{S,min1} \le F_S \le F_{S,min2}$$

$$n_i \text{ even: max } F_S \quad (4a)$$
$$\text{s.t. } \left(\left\lfloor \frac{n_i}{2} \right\rfloor - U\right)F_S < f_{Ci} - \frac{B_i}{2}$$
$$\left(\left\lfloor \frac{n_i}{2} \right\rfloor - L\right)F_S > f_{Ci} + \frac{B_i}{2}$$
$$F_{S,min1} \le F_S \le F_{S,min2}$$

$$\text{max} - F_S \quad (4b)$$
$$\text{s.t. } \left(\left\lfloor \frac{n_i}{2} \right\rfloor - U\right)F_S < f_{Ci} - \frac{B_i}{2}$$
$$\left(\left\lfloor \frac{n_i}{2} \right\rfloor - L\right)F_S > f_{Ci} + \frac{B_i}{2}$$
$$F_{S,min1} \le F_S \le F_{S,min2}$$

Equations (3a) (or (4a)) determine the maximum sampling frequency within the range from S304 that positions the signal within the input channel, and equations (3b) (or (4b)) determine the minimum sampling frequency within the range that still positions the signal within the input channel. It can be shown that for a given choice of M, there are $$\left\lfloor \frac{M}{2} \right\rfloor + 1$$

input channels that are applicable. Worst case, $$2N\left(\left\lfloor \frac{M}{2} \right\rfloor + 1\right)$$

linear programming problems need to be solved to determine all possible sampling frequencies within the range from S304 that will place all N (or a subset of N) signals within input channels of M-path polyphase downconverter channelizer 214. However, if a solution to one linear programming problem is not found, then its counterpart does not need to be solved; i.e., if a solution to equation (3a) does not exist then equation (3b) does not need to be solved. So the minimum number of linear programming problems that need to be solved is $$N\left(\left\lfloor \frac{M}{2} \right\rfloor + 1\right)$$

which occurs when none of the signals can be placed within any of the input channels.

The output of S306 is all possible sampling frequencies within the range from S304 that will place all N (or a subset of N) signals within input channels of M-path polyphase downconverter channelizer 214.

Figure 6:
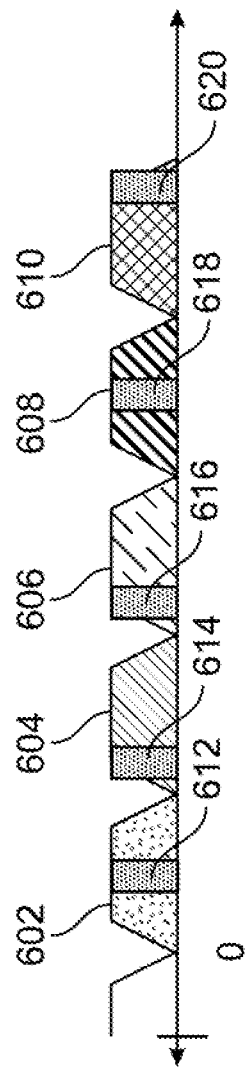
FIG. 6 illustrates an example of five input channels to the M-path polyphase downconverter channelizer in accordance with aspects of the present disclosure.

FIG. 6 illustrates an example of five input channels to M-path polyphase downconverter channelizer 214, including a channel 602, a channel 604, a channel 606, a channel 608 and a channel 610. In this example, signals 612, 614, 616, 618 and 620 are disposed in the respective channels. However, it should be noted that signals 614, 616 and 620 are not centered in their respective channels.

It is then determined whether the signals are placed at the center of the input channels (S308). If they are not, and if possible, it is desirable to place signals at the center of the input channels to the polyphase downconverter channelizer because then the signals will be at baseband at the output of M-path polyphase downconverter channelizer 214 and no further downconversion would be necessary (Y at S308). The center of the input channels to M-path polyphase downconverter channelizer 214 are given by mFs/M for m=0, 1, 2, . . . . However, note that for bandpass sampling, only some of the input channels need to be checked due to the conjugate symmetry of the sampled signal's Fourier transform. It can be shown that only the following values of m need to be checked:

$$m = \begin{cases} 1, 2, \ldots, \frac{M}{2} - 1 & M \text{ even} \\ 1, 2, \ldots, \lfloor \frac{M}{2} \rfloor & M \text{ odd} \end{cases} \quad (5)$$

For illustration, the values of m from equation (5) are also shown in FIGS. 4A-5C. Equation (1) allows a simple calculation to be used to determine if the IF signals can be placed at the center of the input channels:

$$F_S = \begin{cases} \dfrac{f_{Ci}}{\lfloor \frac{n_i}{2} \rfloor - \frac{m}{M}} & n_i \text{ even} \\ \dfrac{f_{Ci}}{\lfloor \frac{n_i}{2} \rfloor + \frac{m}{M}} & n_i \text{ odd} \end{cases} \quad (6)$$

Note that equation (6) only needs to be calculated if a solution was found in S306 for the given signal and input channel.

Figure 7:
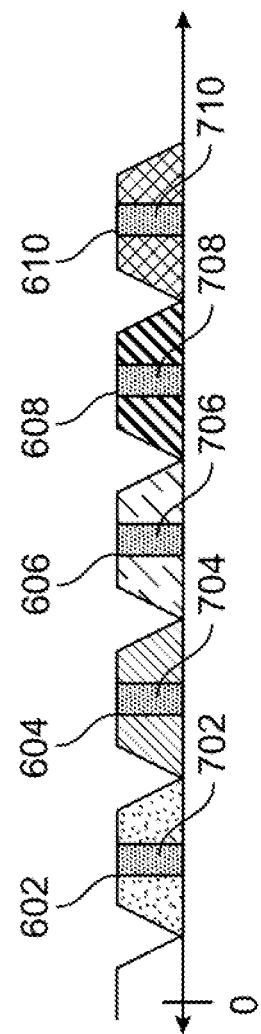
FIG. 7 illustrates an example of five input channels to the M-path polyphase downconverter channelizer in accordance with aspects of the present disclosure, wherein the signals are centrally disposed in each respective input channel.

FIG. 7 illustrates the example of five input channels to M-path polyphase downconverter channelizer 214, of FIG. 6. In this example, the signals 702, 704, 706, 708 and 710 have been sampled so as to be centrally disposed in the respective channels.

If the signals are not centrally disposed in the input channels, then additional known processing may be required (S310).

Looking at the sampling frequencies found in S306, the intersection of the sampling frequency intervals is found that results in the most signals falling within input channels of M-path polyphase downconverter channelizer 214. Then, it is determined whether any of the sampling frequencies found in S308 are within the intersection. If so, this sampling frequency is selected (S312). Otherwise, the smallest sampling frequency in the intersection is selected (S312).

If no signals fall within input channels of M-path polyphase downconverter channelizer 214, return to S304 and repeat the process one more time using the next highest range of sampling frequencies from S304. In an example embodiment, this process is only repeated this one time because repeating more than once may result in significantly higher sampling frequencies that will then outweigh the computational savings provided by S306-S310. If after this one additional iteration of the process, still no signals fall within input channels of M-path polyphase downconverter channelizer 214, then the smallest sampling frequency obtained from the first iteration of S304 is selected (S312).

Once the $F_s$ is selected by frequency-setting component 212 using method 300, sampling frequency instruction 230 is sent to ADC component 208. As discussed above, ADC component 208 down-samples the amplified filtered analog RF signals 228 and converts them to IF digital signals 232 using $F_s$ as indicated by sampling frequency instruction 230. M-path polyphase downconverter channelizer 214 then separates the IF digital signals into different respective channels, separated in the time domain, for distribution as output signals 234, 236, 238, 240 and 242

With the ongoing research in software-defined radio (SDR), cognitive radio, and dynamic spectrum access, a radio may have to receive a signal whose carrier frequency changes over time using bandpass sampling (assuming the radio has a tunable bandpass filter at its RF front end). This may be due to either changes in the environment or due to action taken by the operator. But, no matter what the reasons for a change in carrier frequency, the systems and methods of the present disclosure can be used to quickly and dynamically determine a minimum sampling frequency that would place the IFs at a desired location.

The foregoing description of various embodiments has been presented for purposes of illustration and description. It is not intended to be exhaustive or to limit the disclosure to the precise forms disclosed, and obviously many modifications and variations are possible in light of the above teaching. The example embodiments, as described above, were chosen and described in order to best explain the principles of the disclosure and its practical application to thereby enable others skilled in the art to best utilize the disclosure in various embodiments and with various modifications as are suited to the particular use contemplated. It is intended that the scope of the disclosure be defined by the claims appended hereto.

What is claimed as new and desired to be protected by Letters Patent of the United States is:

1. A system for receiving a plurality N of analog radio frequency signals, said system comprising:
   a bandpass-filtering component operable to bandpass filter the plurality N of analog radio frequency signals;
   an analog to digital converter operable to generate digitally sampled signals based on the bandpass-filtered plurality N of analog radio frequency signals;
   an M-path polyphase downcoverter channelizer operable to output converted intermediate frequency N signals based on the digitally sampled signals, respectively;
   a range-finding component operable to determine a minimum sample frequency range, $[F_{s,min1}, F_{s,min2}]$, for sampling the bandpass-filtered plurality of analog radio frequency signals; and
   a frequency-setting component operable to determine a minimum sampling frequency, $F_s$, and to provide a sampling frequency instruction to said analog to digital converter,
   wherein $F_{s,min1}$ is the smallest sampling frequency that results in no aliasing of the N signals when bandpass sampling is performed,
   wherein $F_{s,min2}$ is larger than $F_{s,min1}$ and additionally results in no aliasing of the N signals when bandpass sampling is performed,
   wherein $F_{s,min1} \leq F_s \leq F_{s,min2}$,
   wherein said analog to digital converter is operable to sample the bandpass-filtered plurality N of analog radio frequency signals using the minimum sampling frequency, $F_s$, indicated in the sampling frequency instruction to generate digitally sampled signals, and
   wherein N is an integer greater than one.

2. The system of claim 1,
   wherein a frequency location of one of the digitally sampled signals from said analog to digital converter is calculated by $$f_{IF} = (-1)^{n+1}\left(-\left\lfloor \frac{n}{2} \right\rfloor F_S + f_C\right)$$

where $f_{IF}$ is the intermediate frequency, n is an integer greater than one, and $\lfloor\ \rfloor$ denotes the mathematical floor operation, wherein each of the intermediate frequency N signals will have a respective value of n associated therewith as calculated by $$n_i = \left\lceil \frac{2\left(f_{Ci} + \frac{B_i}{2}\right)}{F_{S,min1}} \right\rceil$$

wherein $\lceil\ \rceil$ denotes a mathematical ceiling operation, wherein $f_{ci}$ is an arbitrary carrier frequency, and wherein $B_i$ is a bandwidth of one of the N analog radio frequency signals.

3. The system of claim 2, wherein N≤16.

4. The system of claim 3, wherein said range-finding component is further operable to determine whether one of the digitally sampled signals from said analog to digital converter falls entirely within a single channel of said M-path polyphase downcoverter channelizer.

5. The system of claim 1, wherein N≤16.

6. The system of claim 5, wherein said range-finding component is further operable to determine whether one or more of the digitally sampled signals from said analog to digital converter fall entirely within single channels of said M-path polyphase downcoverter channelizer.

7. The system of claim 1, wherein said range-finding component is further operable to determine whether one or more of the digitally sampled signals from said analog to digital converter fall entirely within single channels of said M-path polyphase downcoverter channelizer.

8. A method of receiving a plurality N of analog radio frequency signals, said method comprising:

bandpass filtering, via a bandpass-filtering component, the plurality N of analog radio frequency signals;

generating, via an analog to digital converter, digitally sampled signals based on the bandpass-filtered plurality N of analog radio frequency signals;

outputting, via an M-path polyphase downcoverter channelizer, converted intermediate frequency N signals based on the digitally sampled signals, respectively;

determining, via a range-finding component, a minimum sample frequency range, $[F_{s,min1}, F_{s,min2}]$, for sampling the bandpass-filtered plurality of analog radio frequency signals;

determining, via a frequency-setting component, a minimum sampling frequency, $F_s$, and providing, via the frequency-setting component, a sampling frequency instruction to the analog to digital converter, wherein $F_{s,min1}$ is the smallest sampling frequency that results in no aliasing of the converted intermediate frequency N signals when bandpass sampling is performed, wherein $F_{s,min2}$ is larger than $F_{s,min1}$ and additionally results in no aliasing of the converted intermediate frequency N signals when bandpass sampling is performed, wherein $F_{s,min1} \leq F_s \leq F_{s,min2}$, wherein the analog to digital converter is operable to sample the bandpass-filtered plurality N of analog radio frequency signals using the minimum sampling frequency, $F_s$, indicated in the sampling frequency instruction to generate digitally sampled signals, and wherein N is an integer greater than one.

9. The method of claim 8, wherein the frequency location of one of the digitally sampled signals from the analog to digital converter is calculated by $$f_{IF} = (-1)^{n+1}\left(-\left\lfloor\frac{n}{2}\right\rfloor F_S + f_C\right)$$

where $f_{IF}$ is the intermediate frequency, n is an integer greater than one, and $\lfloor\ \rfloor$ denotes the mathematical floor operation, wherein each of the intermediate frequency N signals will have a respective value of n associated therewith as calculated by $$n_i = \left\lceil \frac{2\left(f_{ci} + \frac{B_i}{2}\right)}{F_{S,min1}} \right\rceil$$

wherein $\lceil\ \rceil$ denotes a mathematical ceiling operation, wherein $f_{ci}$ is an arbitrary carrier frequency, and wherein $B_i$ is a bandwidth of one of the N analog radio frequency signals.

10. The method of claim 9, wherein N≤16.

11. The method of claim 10, further comprising determining, via the range-finding component, whether one or more of the digitally sampled signals from the analog to digital converter fall entirely within single channels of the M-path polyphase downcoverter channelizer.

12. The method of claim 8, wherein N≤16.

13. The method of claim 12, further comprising determining, via the range-finding component, whether one or more of the digitally sampled signals from the analog to digital converter fall entirely within single channels of the M-path polyphase downcoverter channelizer.

14. The method of claim 8, further comprising determining, via the range-finding component, whether one or more of the digitally sampled signals from the analog to digital converter fall entirely within single channels of the M-path polyphase downcoverter channelizer.

15. A non-transitory, tangible, computer-readable media having computer-readable instructions stored thereon, the computer-readable instructions being capable of being read by a computer and being capable of instructing the computer to perform a method of receiving a plurality N of analog radio frequency signals, said method comprising:

bandpass filtering, via a bandpass-filtering component, the plurality N of analog radio frequency signals;

generating, via an analog to digital converter, digitally sampled signals based on the bandpass-filtered plurality N of analog radio frequency signals;

outputting, via an M-path polyphase downcoverter channelizer, converted intermediate frequency N signals based on the digitally sampled signals, respectively;

determining, via a range-finding component, a minimum sample frequency range, $[F_{s,min1}, F_{s,min2}]$, for sampling the bandpass-filtered plurality of analog radio frequency signals;

determining, via a frequency-setting component, the minimum sampling frequency, $F_s$, and providing, via the frequency-setting component, a sampling frequency instruction to the analog to digital converter, wherein $F_{s,min1}$ is the smallest sampling frequency that results in no aliasing of the converted intermediate frequency N signals when bandpass sampling is performed, wherein $F_{s,min2}$ is larger than $F_{s,min1}$ and additionally results in no aliasing of the converted intermediate frequency N signals when bandpass sampling is performed, wherein $F_{s,min1} \leq F_s \leq F_{s,min2}$, wherein the analog to digital converter is operable to sample the bandpass-filtered plurality N of analog radio frequency signals using the minimum sampling frequency, $F_s$, indicated in the sampling frequency instruction to generate digitally sampled signals, and wherein N is an integer greater than one.

16. The non-transitory, tangible, computer-readable media of claim 15, wherein the computer-readable instructions are capable of instructing the computer to perform the method
wherein a frequency location of one of the digitally sampled signals from the analog to digital converter is calculated by $$f_{IF} = (-1)^{n+1}\left(-\left\lfloor\frac{n}{2}\right\rfloor F_S + f_C\right)$$

where $f_{IF}$ is the intermediate frequency, n is an integer greater than one, and $\lfloor\ \rfloor$ denotes the mathematical floor operation, wherein each of the intermediate frequency N signals will have a respective value of n associated therewith as calculated by $$n_i = \left\lceil \frac{2\left(f_{Ci} + \frac{B_i}{2}\right)}{F_{S,min1}} \right\rceil$$

wherein $\lceil\ \rceil$ denotes a mathematical ceiling operation, wherein $f_{ci}$ is an arbitrary carrier frequency, and wherein $B_i$ is a bandwidth of one of the N analog radio frequency signals.

17. The non-transitory, tangible, computer-readable media of claim 16, wherein the computer-readable instructions are capable of instructing the computer to perform the method wherein N≤16.

18. The non-transitory, tangible, computer-readable media of claim 17, wherein the computer-readable instructions are capable of instructing the computer to perform the method, further comprising determining, via the range-finding component, whether one of the digitally sampled signals from the analog to digital converter falls entirely within a single channel of the M-path polyphase downconverter channelizer.

19. The non-transitory, tangible, computer-readable media of claim 15, wherein the computer-readable instructions are capable of instructing the computer to perform the method wherein N≤16.

20. The non-transitory, tangible, computer-readable media of claim 19, wherein the computer-readable instructions are capable of instructing the computer to perform the method, further comprising determining, via the range-finding component, whether one or more of the digitally sampled signals from the analog to digital converter fall entirely within single channels of the M-path polyphase downconverter channelizer.

* * * * *